United States Patent
Lefler et al.

(10) Patent No.: US 12,502,133 B2
(45) Date of Patent: Dec. 23, 2025

(54) SENSING SYSTEM INCLUDING LAYERED MICROPROBE

(71) Applicant: QuLab Medical Ltd., Herzliya (IL)

(72) Inventors: Sharon Lefler, Herzliya (IL); Idan Tamir, Herzliya (IL); David Schreiber, Herzliya (IL); Hila Masasa, Herzliya (IL)

(73) Assignee: QuLab Medical Ltd., Herzliya (IL)

( * ) Notice: Subject to any disclaimer, the term of this patent is extended or adjusted under 35 U.S.C. 154(b) by 687 days.

(21) Appl. No.: 17/867,200

(22) Filed: Jul. 18, 2022

(65) Prior Publication Data
US 2022/0346713 A1   Nov. 3, 2022

Related U.S. Application Data

(63) Continuation of application No. PCT/IB2021/000012, filed on Jan. 15, 2021.
(Continued)

(51) Int. Cl.
  *A61B 5/00*   (2006.01)
(52) U.S. Cl.
  CPC ........ *A61B 5/685* (2013.01); *A61B 2562/028* (2013.01)
(58) Field of Classification Search
  CPC ........ A61B 5/150282; A61B 5/150984; A61B 5/685; A61B 2562/028; A61B 5/14865;
(Continued)

(56) References Cited

U.S. PATENT DOCUMENTS

| | | | |
|---|---|---|---|
| 6,379,324 B1 * | 4/2002 | Gartstein | A61B 5/150458 604/20 |
| 6,558,361 B1 * | 5/2003 | Yeshurun | A61M 37/0015 604/274 |

(Continued)

FOREIGN PATENT DOCUMENTS

CN   102724913 A   * 10/2012   ......... A61B 5/14546

OTHER PUBLICATIONS

International Search Report and Written Opinion from International Application No. PCT/IB2021/000012 dated Jul. 7, 2021.
(Continued)

*Primary Examiner* — Brian L Casler
(74) *Attorney, Agent, or Firm* — Greenberg Traurig, LLP

(57) ABSTRACT

A sensing system includes a microprobe, the microprobe including: a layered structure including: a sensing unit comprising a sensor including a working electrode, wherein the sensing unit has a first perimeter when viewed along a layering direction, includes a first material having a first toughness, and including a first side and a second side; a deformable layer configured to deform under stress and positioned on the first side of the sensing unit; a ductile layer positioned on the deformable layer opposite the sensing unit and having a second perimeter when viewed along the layering direction, the first perimeter being within the second perimeter, the ductile layer including a second material having a second toughness greater than the first toughness; a sensor-interface layer positioned on the second side of the sensing unit; and an encapsulant partially encapsulating the layered structure and mechanically isolating the layered structure from a surrounding environment.

21 Claims, 11 Drawing Sheets

Related U.S. Application Data

(60) Provisional application No. 62/962,677, filed on Jan. 17, 2020.

(58) Field of Classification Search
CPC .............. A61B 5/6833; A61B 2562/02; A61B 2562/18; A61B 2562/16
USPC ........................................................ 600/345
See application file for complete search history.

(56) References Cited

U.S. PATENT DOCUMENTS

| | | | |
|---|---|---|---|
| 2002/0082543 A1 | 6/2002 | Park et al. | |
| 2002/0188221 A1* | 12/2002 | Sohrab | A61B 5/150503 600/573 |
| 2003/0212346 A1* | 11/2003 | Yuzhakov | A61B 5/150282 600/584 |
| 2009/0259118 A1* | 10/2009 | Feldman | A61B 5/1495 600/345 |
| 2016/0346466 A1 | 12/2016 | Wang et al. | |
| 2019/0076075 A1* | 3/2019 | Miller | A61B 5/150022 |
| 2025/0025078 A1* | 1/2025 | Kendall | A61B 5/14514 |

OTHER PUBLICATIONS

Ribet, "Integrated microsystems for continuous glucose monitoring, interstitial fluid sampling and digital microfluidics", KTH Royal Institute of Technology School of Electrical Engineering and Computer Science Division of Micro and Nanosystems, Jan. 2020.

* cited by examiner

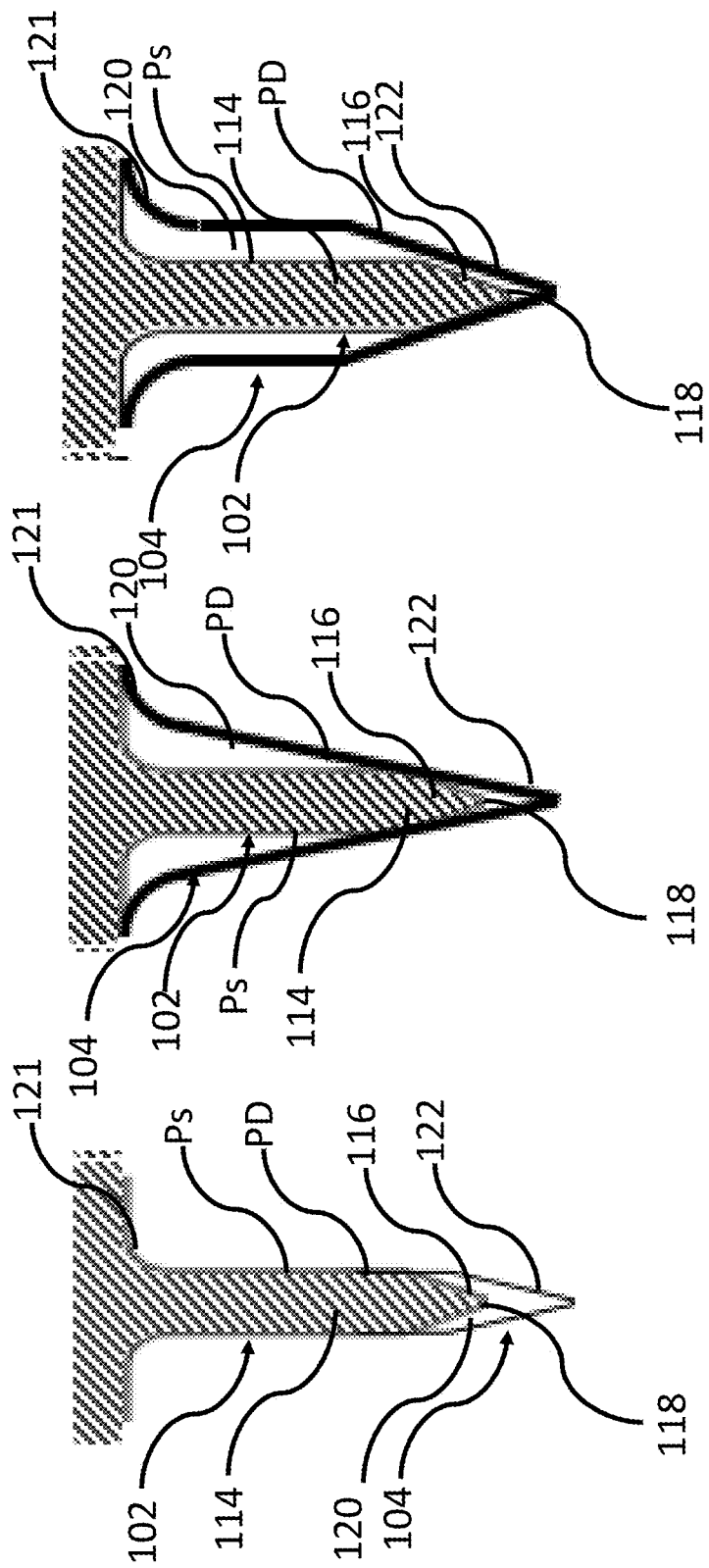

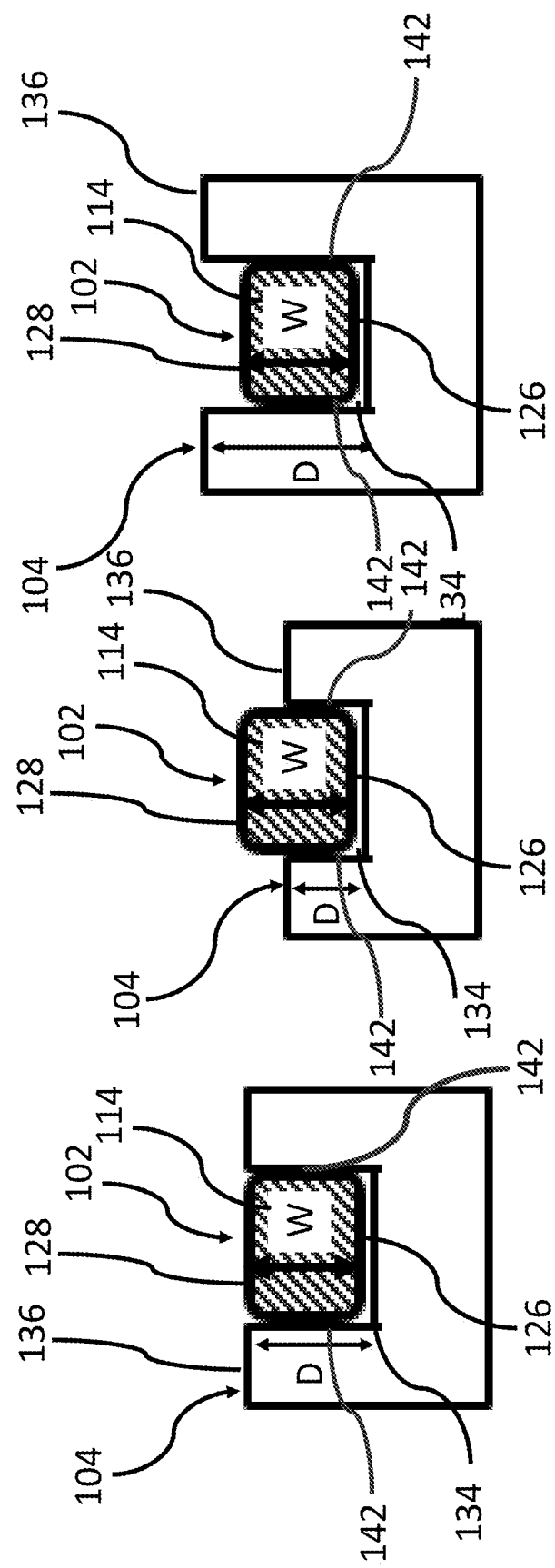

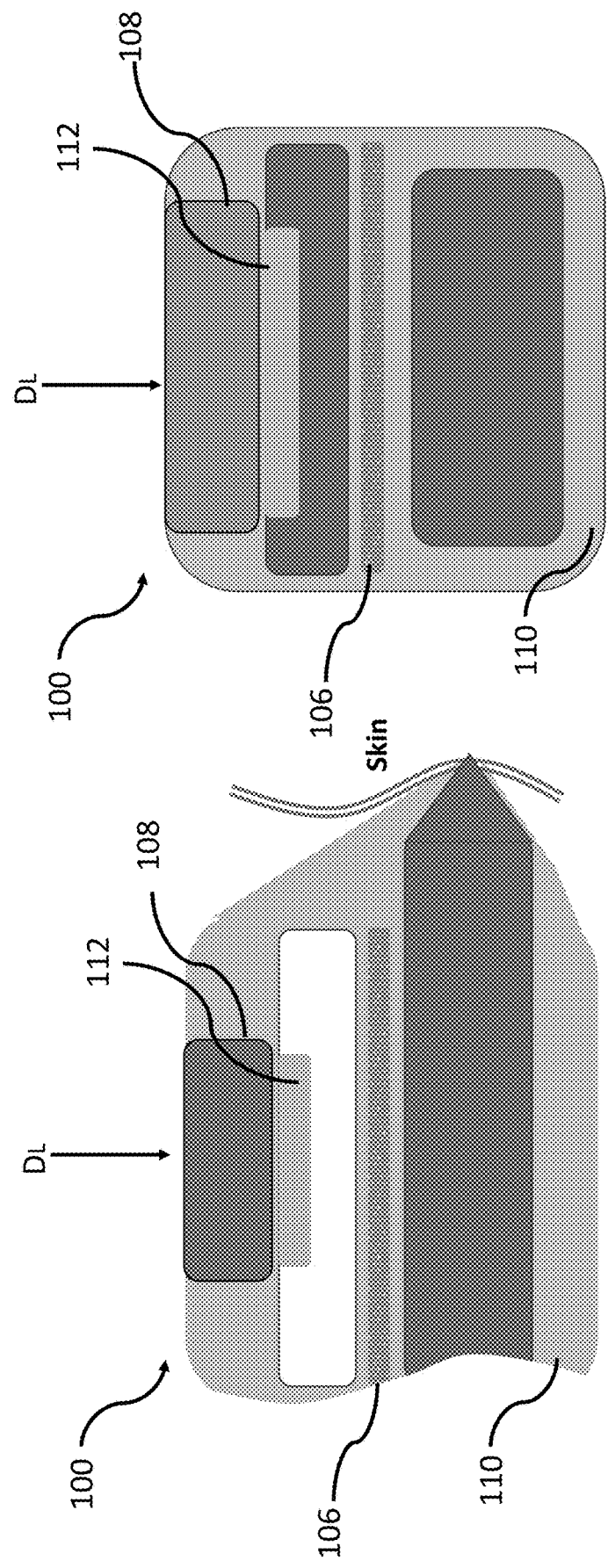

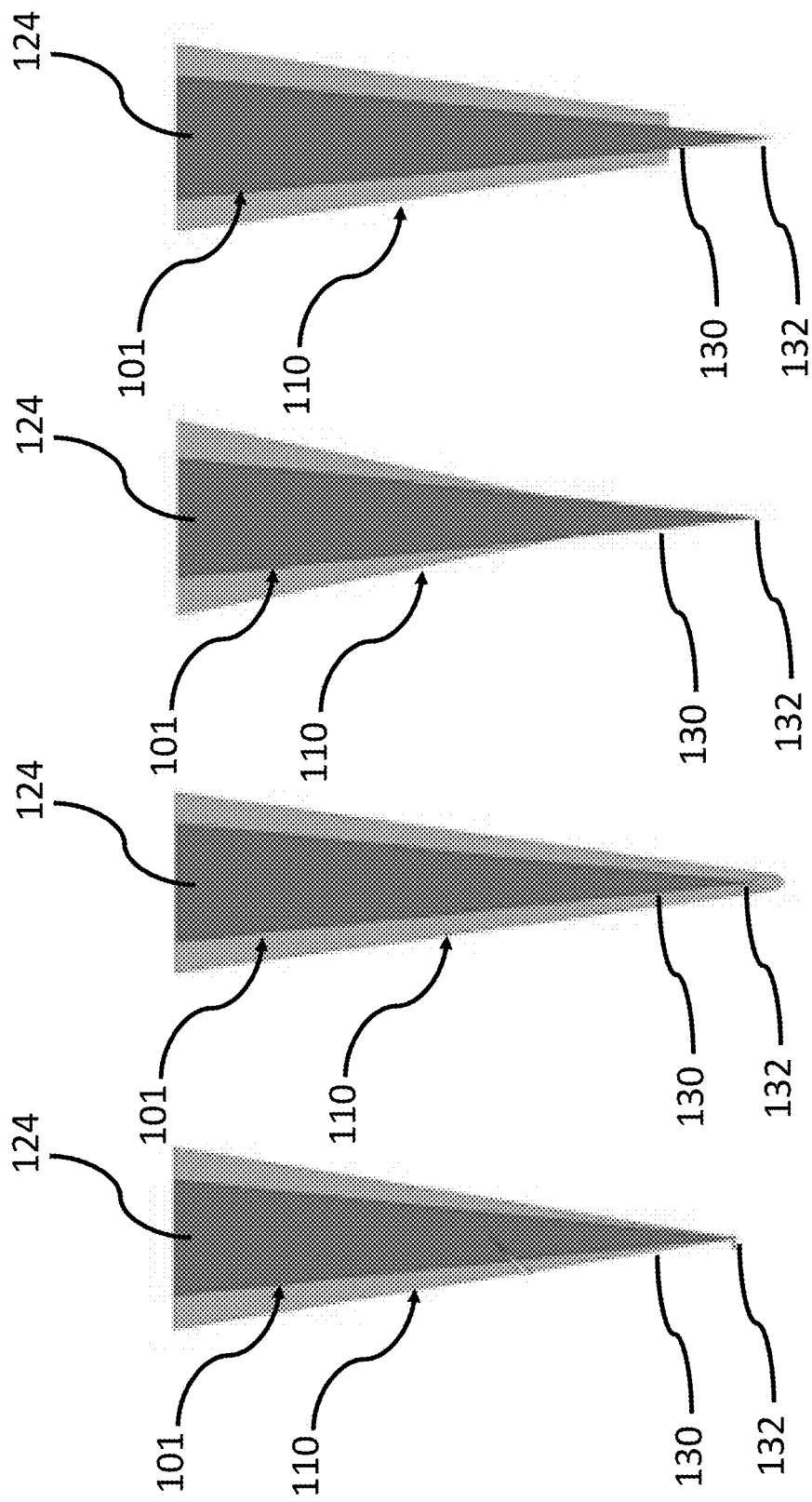

SENSING SYSTEM INCLUDING LAYERED MICROPROBE

CROSS-REFERENCE TO RELATED APPLICATION

This application is a continuation of International Application No. PCT/IB2021/000012, filed on Jan. 15, 2021 and entitled "SENSING SYSTEM INCLUDING LAYERED MICROPROBE", which claims the benefit of commonly-owned, co-pending U.S. Provisional Patent Application No. 62/962,677, filed on Jan. 17, 2020 and entitled "SENSING SYSTEM INCLUDING LAYERED MICROPROBE," the contents of which are incorporated herein by reference in their entirety.

FIELD

The present disclosure relates to sensing and sensing systems including one or more layered microprobes or microneedles and to related methods.

BACKGROUND

Micro-sensing systems, such as sensors mounted on microneedles, microprobes or neural probes are commonly used for biological and other applications.

SUMMARY OF THE INVENTION

This summary is a high-level overview of various aspects of the invention and introduces some of the concepts that are further detailed in the Detailed Description section below. This summary is not intended to identify key or essential features of the claimed subject matter, nor is it intended to be used in isolation to determine the scope of the claimed subject matter. The subject matter should be understood by reference to the appropriate portions of the entire specification, any or all drawings, and each claim.

Embodiments of the present disclosure relate to a sensing system including at least one microprobe. The microprobe is comprised of a layered structure including a sensing unit having at least one sensor, wherein the at least one sensor comprises a working electrode, wherein the sensing unit has a first perimeter when viewed along a layering direction of the layered structure, wherein the sensing unit comprises a first material having a first material toughness, and wherein the sensing unit includes a first side and an opposing second side. The layered structure also includes a deformable layer positioned on the first side of the sensing unit, wherein the deformable layer is configured to deform under stress. The layered structure also includes a ductile layer positioned on the deformable layer opposite the sensing unit, wherein the ductile layer has a second perimeter when viewed along the layering direction of the layered structure, wherein the first perimeter is entirely within the second perimeter, and wherein the ductile layer comprises a second material having a second material toughness greater than the first material toughness. The deformable layer is also configured to couple the sensing unit to the ductile layer and partially transfer the strain resulting from stress applied to the sensor unit to the ductile layer. The layered structure also includes a sensor-interface layer positioned on the second side of the sensing unit. The microprobe also includes at least one encapsulant, wherein the at least one encapsulant at least partially encapsulates the layered structure, and wherein the at least one encapsulant is configured to isolate the layered structure from a surrounding environment.

In some embodiments, the encapsulant is configured to contain debris originating from at least one of the first material, the second material, a deformable layer material, or a sensor-interface material.

In some embodiments, the encapsulant is at least one of: chemically inert, biocompatible, biodegradable, anti-fouling, hydrophobic or hydrophilic.

In some embodiments, the encapsulant is configured to mechanically isolate the layered structure from the surrounding environment.

In some embodiments, the encapsulant is configured to electrically isolate the layered structure from the surrounding environment.

In some embodiments, the encapsulant has a thickness of 100 nanometers to 200 microns.

In some embodiments, the encapsulant includes an opening to the sensor-interface layer.

In some embodiments, the opening is covered or filled with a hydrogel that is configured to increase in volume when in contact with liquid.

In some embodiments, the encapsulant completely encapsulates the layered structure.

In some embodiments, at least a portion of the tip of the sensing unit is not encapsulated.

In some embodiments, the encapsulant layer comprises: polyamide, Parylene, polyurethane or a combination thereof.

In some embodiments, the sensor-interface layer is at least one of: chemically inert, biocompatible, biodegradable, anti-fouling, hydrophobic or hydrophilic.

In some embodiments, the sensor-interface layer has a thickness of 10 nanometers to 200 microns.

In some embodiments, the sensor-interface layer contains a hydrogel.

In some embodiments, the deformable layer is an adhesive.

In some embodiments, the deformable layer is comprised of: polyurethane, silicone, resin, polyacrylate ester, polyamide, SU-8, polymethyl methacrylate, Parylene, epoxy resin, silicone resin or a combination thereof.

In some embodiments, the deformable layer is reinforced with a metal oxide such as, for example, aluminum oxide, silicon oxide, silicon oxynitride or a combination thereof.

In some embodiments, the deformable layer has a thickness of 1 micron to 100 microns.

In some embodiments, the sensing unit is adhered to the ductile layer by a multi-layered structure comprising a first adhesive, the deformable material, and a second adhesive.

In some embodiments, a thickness of the deformable layer is less than a surface roughness of each of the sensing unit and the ductile layer.

In some embodiments, the deformable layer electrically insulates the sensing unit from the ductile layer.

In some embodiments, at least one of the sensing unit and the ductile layer is encapsulated by: an oxide, a metal oxide, a native oxide, a polymer or a combination thereof.

In some embodiments, the ductile layer comprises for example: stainless steel, cobalt, titanium, aluminum, nickel, chromium, molybdenum, tungsten and their alloys.

In some embodiments, the ductile layer comprises a recess in a surface adjacent to the sensing unit, wherein the sensing unit is received within and at least partially enclosed by the recess.

In some embodiments, a depth of the recess equals a dimension between a first side of the sensing unit that is adjacent to the ductile layer and a second side of the sensing unit opposite the first side.

In some embodiments, a depth of the recess is greater than a dimension between a first side of the sensing unit that is adjacent to the ductile layer and a second side of the sensing unit opposite the first side.

In some embodiments, a depth of the recess is smaller than a dimension between a first side of the sensing unit that is adjacent to the ductile layer and a second side of the sensing unit opposite the first side.

In some embodiments, the sensing unit comprises a shaft and a tip.

In some embodiments, the ductile layer comprises a shaft and a tip.

In some embodiments, the tip of the ductile layer projects distally past the tip of the sensing unit so that the ductile layer is configured to absorb axial insertion forces applied thereto during use.

Embodiments of the present disclosure also relate to a microprobe including a layered structure. The layered structure includes a sensing unit having at least one sensor, wherein the at least one sensor comprises a working electrode, wherein the sensing unit has a first perimeter when viewed along a layering direction of the layered structure, wherein the sensing unit comprises a first material having a first material toughness, and wherein the sensing unit includes a first side and an opposing second side. The layered structure also includes a deformable layer positioned on the first side of the sensing unit, wherein the deformable layer is configured to deform under stress. The layered structure also includes a ductile layer positioned on the deformable layer opposite the sensing unit, wherein the ductile layer has a second perimeter when viewed along the layering direction of the layered structure, wherein the first perimeter is entirely within the second perimeter, and wherein the ductile layer comprises a second material having a second material toughness greater than the first material toughness. The deformable layer is also configured to couple the sensing unit to the ductile layer and partially transfer the strain resulting from stress applied to the sensor unit to the ductile layer. The layered structure also includes a sensor-interface layer positioned on the second side of the sensing unit. The microprobe also includes at least one encapsulant, wherein the at least one encapsulant at least partially encapsulates the layered structure, and wherein the at least one encapsulant is configured to isolate the layered structure from a surrounding environment.

BRIEF DESCRIPTION OF THE DRAWINGS

Some embodiments of the present disclosure are herein described, by way of example only, with reference to the accompanying drawings. With specific reference now to the drawings in detail, particulars shown are by way of example and for purposes of illustrative discussion of the embodiments of the invention. In this regard, the description taken with the drawings makes apparent to those skilled in the art how embodiments of the invention may be practiced.

FIG. 4 is a top view of a microprobe shaft and tip according to a first exemplary embodiment of the present disclosure;

FIG. 5 is a top view of a microprobe shaft and tip according to a second exemplary embodiment of the present disclosure;

FIG. 6 is a top view of a microprobe shaft and tip according to a third exemplary embodiment of the present disclosure;

FIG. 12 is a cross-sectional view of a sensing unit and a ductile layer according to a first exemplary embodiment of the present disclosure;

FIG. 13 is a cross-sectional view of a sensing unit and a ductile layer according to a second exemplary embodiment of the present disclosure;

FIG. 14 is a cross-sectional view of a sensing unit and a ductile layer according to a third exemplary embodiment of the present disclosure;

FIG. 15 is a side cross-sectional view of a microprobe according to exemplary embodiments of the present disclosure;

FIG. 16 is a front cross-sectional view of the microprobe of FIG. 15 according to exemplary embodiments of the present disclosure;

FIG. 17 is a cross-sectional view of a portion of a microprobe shaft and tip according to a first exemplary embodiment of the present disclosure;

FIG. 18 is a cross-sectional view of a portion of a microprobe shaft and tip according to a second exemplary embodiment of the present disclosure;

FIG. 19 is a cross-sectional view of a portion of a microprobe shaft and tip according to a third exemplary embodiment of the present disclosure;

FIG. 20 is a cross-sectional view of a portion of a microprobe shaft and tip according to a fourth exemplary embodiment of the present disclosure.

DETAILED DESCRIPTION

Figure 1A:
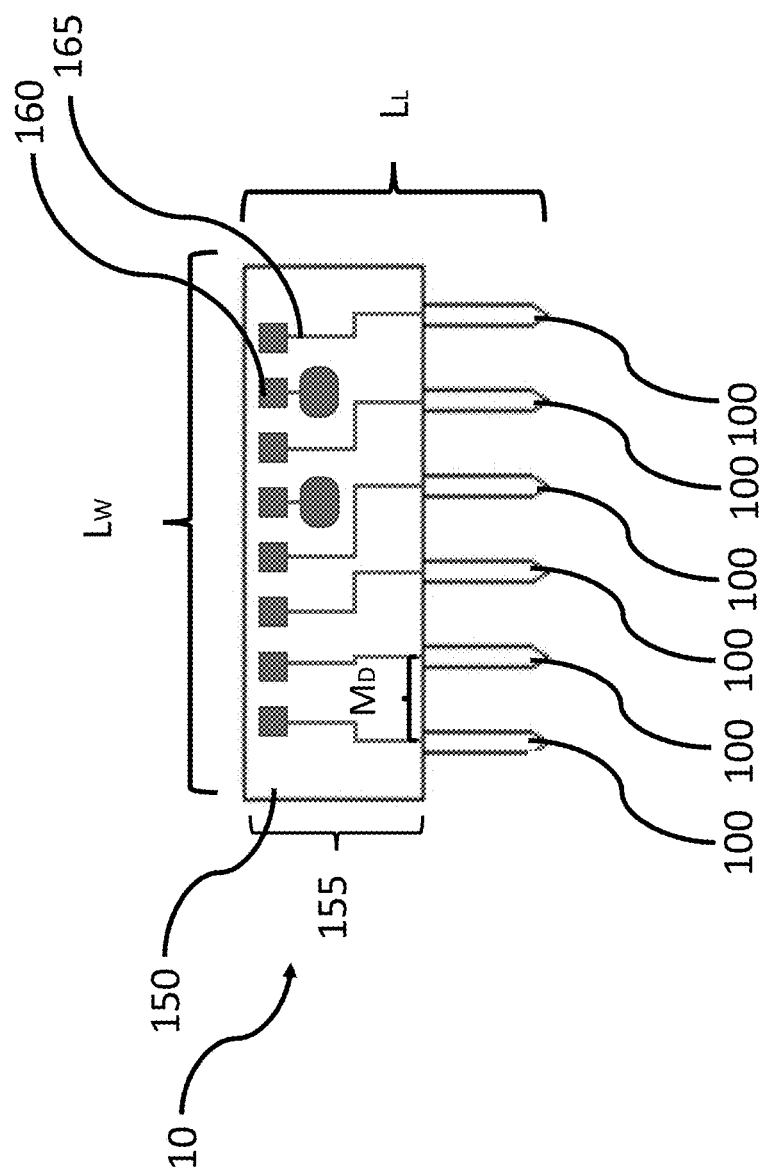
FIG. 1A is a top view of a sensing system including an array of layered microprobes according to an exemplary embodiment of the present disclosure.

The following description of the preferred embodiment(s) is merely exemplary in nature and is in no way intended to limit the invention, its application, or uses. As used throughout, ranges are used as shorthand for describing each and every value that is within the range. Any value within the range can be selected as the terminus of the range. In addition, all references cited herein are hereby incorporated by reference in their entirety. In the event of a conflict in definition between the present disclosure and that of a cited reference, the present disclosure prevails.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention.

Relative terms such as "lower," "upper," "horizontal," "vertical," "above," "below," "up," "down," "left," "right," "top" and "bottom" as well as derivatives thereof (e.g., "horizontally," "downwardly," "upwardly," etc.) should be construed to refer to the orientation as described or as shown in the drawing under discussion. These relative terms are for convenience of description only and do not require that the apparatus be constructed or operated in a particular orientation unless explicitly indicated.

As used herein, the term "proximal" means in a direction towards a user of the device or system and the term "distal" means in a direction away from the user.

Terms such as "attached," "affixed," "connected," "coupled," "interconnected," "mounted" and similar refer to a relationship wherein structures are secured or attached to one another either directly or indirectly through intervening structures, as well as both movable or rigid attachments or relationships, unless expressly described otherwise.

As used in the specification and the claims, the singular form of "a", "an", and "the" include plural referents unless the context clearly dictates otherwise.

Spatial or directional terms, such as "left", "right", "inner", "outer", "above", "below", and the like, are not to be considered as limiting as the invention can assume various alternative orientations.

All numbers used in the specification and claims are to be understood as being modified in all instances by the term "about". The term "about" means a range of plus or minus ten percent of the stated value.

Unless otherwise indicated, all ranges or ratios disclosed herein are to be understood to encompass any and all subranges or sub ratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

The terms "first", "second", and the like are not intended to refer to any particular order or chronology, but instead refer to different conditions, properties, or elements.

All documents referred to herein are "incorporated by reference" in their entirety.

The term "at least" means "greater than or equal to". The term "not greater than" means "less than or equal to".

The term "includes" is synonymous with "comprises".

As used herein, the term "microprobe" is interchangeable with the terms "microneedle" and "neural probe".

As used herein, the term "working electrode" is typically a metal, e.g. gold, silver, tin, zinc, copper, cadmium, chromium, nickel, platinum, palladium, rhodium, tantalum, titanium and titanium nitride deposited electrode, connected to a voltage source, on which a redox reaction may occur in an electrochemical sensor.

As used herein, the term "material toughness" is defined as energy per unit volume that can be absorbed before-fracture.

As used herein, the term "zero debris" process is defined as a process that results in minimal, near zero, or zero debris. The design of the microprobe is to support a zero debris process, for example, with an encapsulant, or by mechanically protecting the brittle material tip and or by providing a layered structure with compliant materials that can reduce forces and torques on the brittle material.

As used herein, the term "tip" is defined as a sharp narrow distal portion of a unit, wherein the unit can be a microprobe, a sensing unit, a layered structure, or a ductile layer.

As used herein, the term "distal end" is defined as a distal-most point or line of a unit. For example, the distal end of a tip of a microprobe is the part of the microprobe that contacts the skin first.

As used herein, the term "shaft" is defined as a portion of a unit connecting a tip thereof with a base thereof. In some embodiments, a tip and shaft can be distinguished by a change in geometry. In some cases, the tip and shaft converge geometrically such that there is no exact line separating the two.

For biological and other applications, there is often a need to use micro-sensing systems, such as sensors fabricated or mounted on microneedles, microprobes or neural probes. There is an advantage to designing a chip-based sensor system including a sensor and a structure on which the sensor is mounted that can be manufactured by standard semiconductor manufacturing processes. In some applications it is beneficial to place elements of the sensor as close as possible to the medium being sensed. In the case of a chip-based sensor system, the sensing element can be placed in proximity to the tip of a microprobe, allowing sensing element tissue insertion and placement.

Figure 1B:
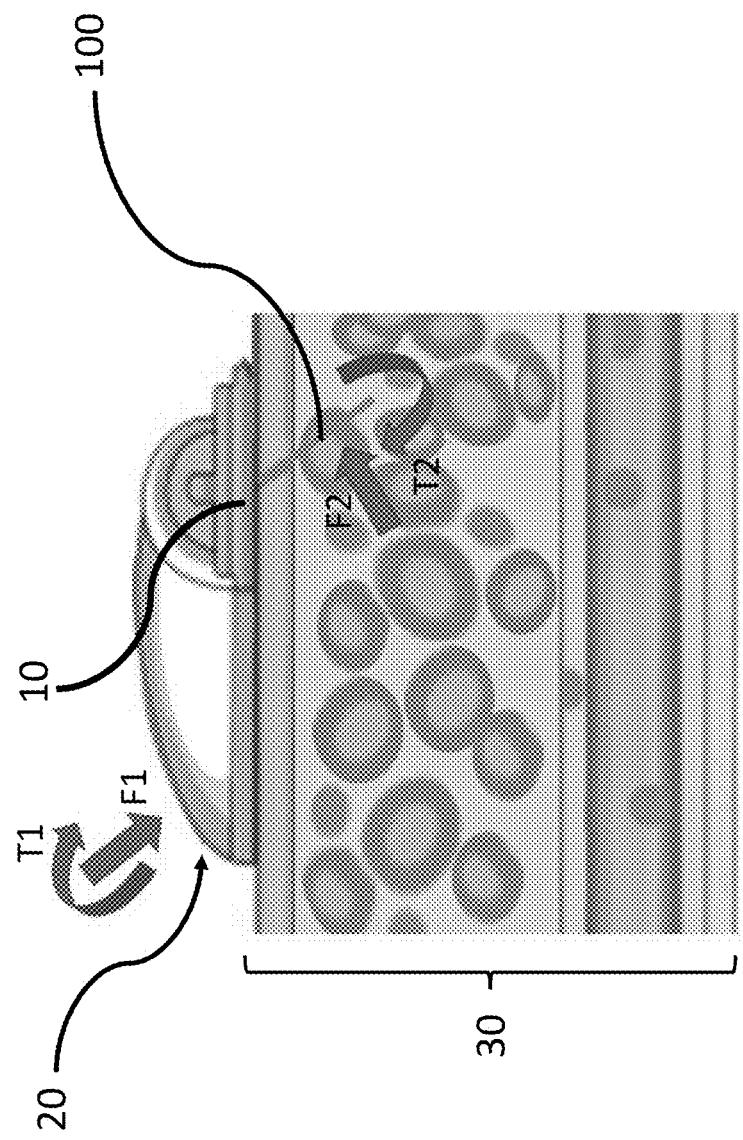
FIG. 1B is a perspective view of a patch mounted on the skin including a sensing system having a layered microprobe according to exemplary aspects of the present disclosure.

During usage, production and/or handling, forces or torques are being applied or generated on the chip-based sensor system and the microneedles. For example, as depicted in FIG. 1B, in chip-based sensor systems, such as exemplary sensing system 10 with microprobes 100 that are inserted through the skin and penetrate the epidermal layer via, for example, a skin-mounted patch 20. Forces and torques (depicted by the arrows in FIG. 1B) are applied on the microprobes during patch placement and microprobe insertion through the epidermis and or portions of the dermis, or while the patch is being worn, due to e.g., limb motion and/or muscle movement with respect to the patch, as well as when the patch is being removed from the skin.

In general, the thinner the microprobe and the smaller its dimensions, the lesser the pain felt during microneedle insertion. This reduction in pain is due to smaller insertion forces required for the microprobe in penetrating the skin and overall smaller number of nerve endings affected by such insertion. However, the mechanical, size and shape requirements of the microprobe structure may vary depending on the application, and often include conflicting design requirements.

In one example, in order to minimize insertion forces, the microprobe must have a sharp and pointed tip. However, microprobes are often formed from brittle materials such as, for example, silicon, in which a sharp and pointed tip might not be able to withstand the required insertion forces.

In another example, it may be beneficial to position the sensor element in close proximity to the microprobe tip for improved sensing, which dictates the shape and minimal size of the microprobe tip. These shape and size requirements may conflict with the desired shape and size requirements for minimizing pain during microprobe insertion.

Additionally, material properties are a significant contributor to microprobe design. Specifically, because most chip-based sensor systems are formed from brittle materials, the size and shape of the microprobe must be increased to form a mechanically reliable structure. Microprobe mechanical reliability is a significant design concern. Specifically, the design of the microprobe must ensure that portions thereof will not fracture leading to potential break off during handling, insertion, application and/or removal because microprobe fragments or traces could be toxic or otherwise harmful.

The present disclosure relates to a novel, reliable sensing system including a layered microprobe with a mechanically robust microprobe sensor that can be manufactured using standard semiconductor manufacturing processes. The described sensing system is configured to withstand forces and torques that may be applied or incurred during usage and handling while minimizing pain during insertion. Furthermore, the sensing system ensures that insertion, application and removal of the microprobe is a "zero debris" process.

As noted above, FIG. 1A depicts a sensing system 10. In the embodiment of FIG. 1A, the sensing system 10 includes a planar array 150 having a base 155 and a plurality of layered microprobes 100. The sensing system 10 also includes electrical components including connectors 160 and traces 165. However, in other embodiments, the sensing system 10 includes more or less than six layered microprobes. In other embodiments, the sensing system 10 includes a single layered microprobe 100.

In some embodiments, the sensing system 10 may be integrated into a patch that is worn on the skin for a period of time. FIG. 1B depicts an exemplary sensor patch 20 which includes a sensing system 10 having at least one layered microprobe 100 inserted into the skin 30 of a user. In some embodiments, the sensor patch 20 includes a shell or cover housing an insertion system, a power unit, and electronics. FIG. 1B also depicts the forces F1, F2 and torques T1, T2 that may be applied to a patch 20 and the microprobes 100 during insertion. Specifically, force F1 and torque T1 act on the patch during, for example, insertion and mounting, while force F2 and torque T2 are reactionary forces acting on the microprobe 100 in the skin due to F1 and T1.

Figure 2:
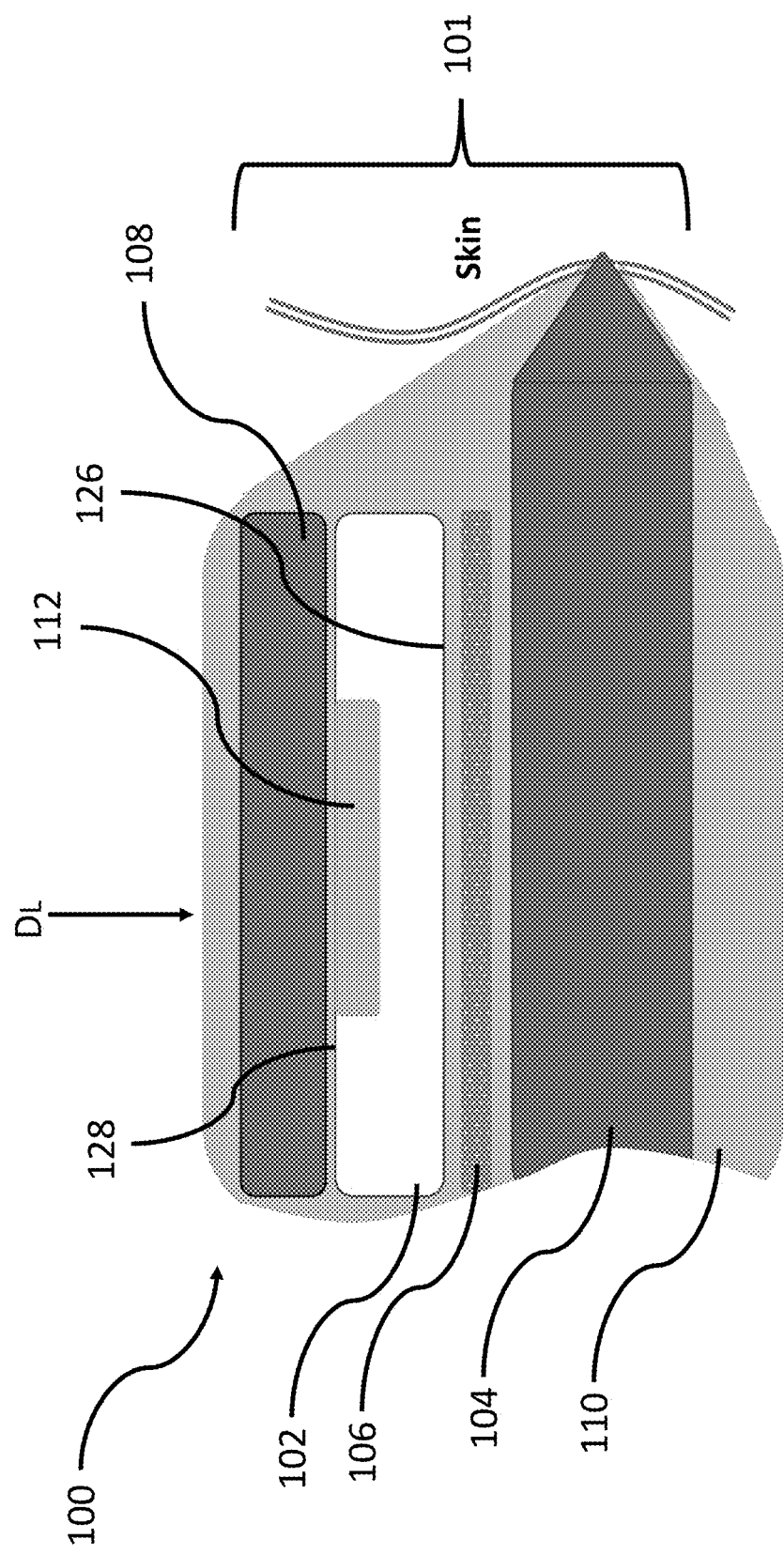
FIG. 2 is a cross-sectional view of a microprobe including a layered structure to exemplary embodiments of the present disclosure.

FIG. 2 depicts a microprobe 100 having a layered structure 101 including a sensing unit 102, a ductile layer 104, a deformable layer 106 and a sensor-interface layer 108. The microprobe 100 also includes at least one encapsulant 110 which at least partially encapsulates the layered structure 101 of the microprobe 100, as will be described in further detail below.

According to some aspects of the present disclosure, the sensing unit 102 comprises at least one sensor 112. For example, in some embodiments, the sensor 112 is a field-effect-transistor (FET)-based sensor including a working electrode. In some embodiments, the sensor 112 is a silicon-based FET sensor. In other embodiments, the sensor 112 is any type of electrochemical, biosensor, temperature sensor, light sensitive sensor, acoustic sensor, impedance sensor, electromagnetic sensor, magnetic sensor or radiation sensor.

Figure 3:
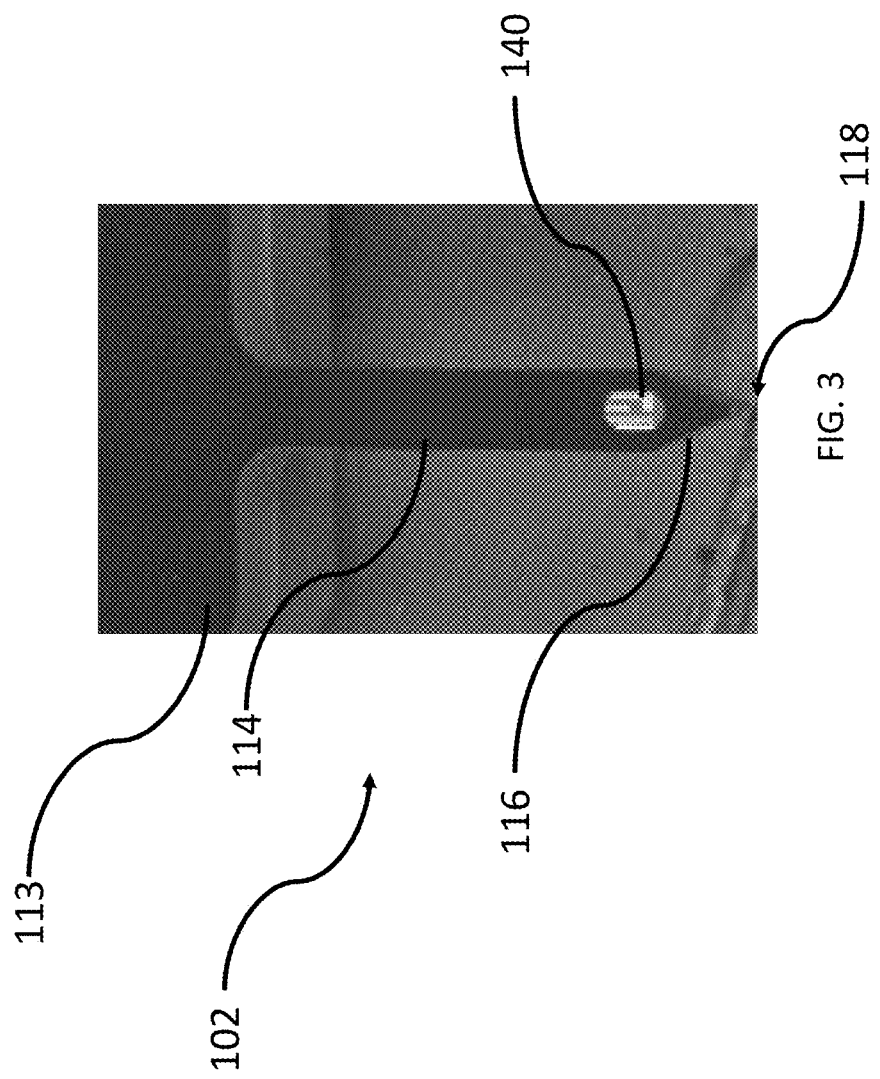
FIG. 3 is a top view of a sensing unit shaft and tip according to an exemplary embodiment of the present disclosure, obtained with scanning electron microscopy.

As depicted in FIG. 3, in some embodiments the sensing unit 102 is shaped for insertion into a subject's skin. Specifically, the sensing unit 102 comprises, in some embodiments, a base 113 an elongated shaft 114 that extends to a distal tip 116. The distal tip 116 may have a variety of configurations, as will be described in further detail below.

In some embodiments, a thickness of the sensing unit 102 is from 0.01 mm to 0.3 mm. In other embodiments, a thickness of the sensing unit 102 is from 0.05 mm to 0.3 mm. In other embodiments, a thickness of the sensing unit 102 is from 0.1 mm to 0.3 mm. In other embodiments, a thickness of the sensing unit 102 is from 0.15 mm to 0.3 mm. In other embodiments, a thickness of the sensing unit 102 is from 0.1 mm to 0.3 mm. In other embodiments, a thickness of the sensing unit 102 is from 0.25 mm to 0.3 mm.

In some embodiments, a thickness of the sensing unit 102 is from 0.01 mm to 0.25 mm. In other embodiments, a thickness of the sensing unit 102 is from 0.01 mm to 0.2 mm. In other embodiments, a thickness of the sensing unit 102 is from 0.01 mm to 0.15 mm. In other embodiments, a thickness of the sensing unit 102 is from 0.01 mm to 0.1 mm. In other embodiments, a thickness of the sensing unit 102 is from 0.01 mm to 0.05 mm.

In some embodiments, a thickness of the sensing unit 102 is from 0.05 mm to 0.25 mm. In other embodiments, a thickness of the sensing unit 102 is from 0.1 mm to 0.15 mm. In other embodiments, a thickness of the sensing unit 102 is from 0.1 mm to 0.25 mm. In other embodiments, a thickness of the sensing unit 102 is from 0.15 mm to 0.2 mm. In other embodiments, a thickness of the sensing unit 102 is from 0.05 mm to 0.25 mm. In other embodiments, a thickness of the sensing unit 102 is from 0.05 mm to 0.1 mm.

Conventionally, semiconductor-based sensing units comprise a brittle material. For example, in some embodiments, the brittle material can be any semiconductor material such as silicon (Si), germanium (Ge), and tin (Sn) in column IV and selenium (Se) and tellurium (Te) in column VI of the periodic table, as well as compound semiconductors, which are composed of two or more elements, Gallium arsenide (GaAs), for example, or ternary compounds mercury indium telluride (HgIn2Te4). As well as semiconductor oxides (silicon oxide) and metal oxides (aluminum oxide) semiconductor metal oxides (zinc oxide). These sensing units often have sharpened tips for skin insertion. However, the silicon (Si) building material of such sensing units is brittle such that small forces or torques will cause the Si to fracture, which may result in a break, releasing Si fragments. A sharp Si tip will often not be able to sustain external forces, axial or other, such as needed for skin insertion without fracturing or breaking, potentially leaving behind microscopic-sized debris or fragments. Furthermore, a silicon-based tip is very difficult to manufacture and sharpen to a sharp tip.

To prevent the brittle Si from fracture and/or fragmentation, in some embodiments, the Si-based sensing unit 102 is mounted on the ductile layer 104. In some embodiments, the ductile layer 104 comprises a material that is capable of absorbing most of the external forces applied to the microprobe 100 during handling and insertion. In some embodiments, the ductile layer 104 comprises, for example, any metal, metal alloy or composite material. In some embodiments, the ductile layer 104 comprises Stainless Steel. The material toughness of the ductile layer material, in some embodiments, is significantly larger than that of the silicon-based sensing unit such that the combined structure of the sensing unit 102 and the ductile layer 104 is capable of withstanding external forces/torques higher than either of the separate materials alone. For example, in some embodiments, the material toughness of the ductile layer material is an order of magnitude larger than that of the sensing unit material. Thus, the ductile layer 104 serves to support the brittle sensing unit 102 enabling the functionality of such sensing unit microstructures that are made from such brittle materials. Additionally, the combined toughness of the sensing unit 102 and the ductile layer 104 allows for a thinner microprobe design than a microprobe that uses the brittle material, for example Si, of the sensing unit 102 alone.

As described above, in some embodiments, the ductile layer 104 is configured to absorb the forces and torques applied to the microprobe 100 during its usage and/or handling. As such, the ductile layer 104 is shaped to reduce or dissipate the forces and torques applied to the microprobe 100 during its usage and/or handling. Specifically, as depicted in FIG. 4, the ductile layer 104 substantially tracks the shape of the sensing unit 102 in some planes, providing support to the sensing unit 102, while being shaped to provide protection in other aspects.

Figure 7:
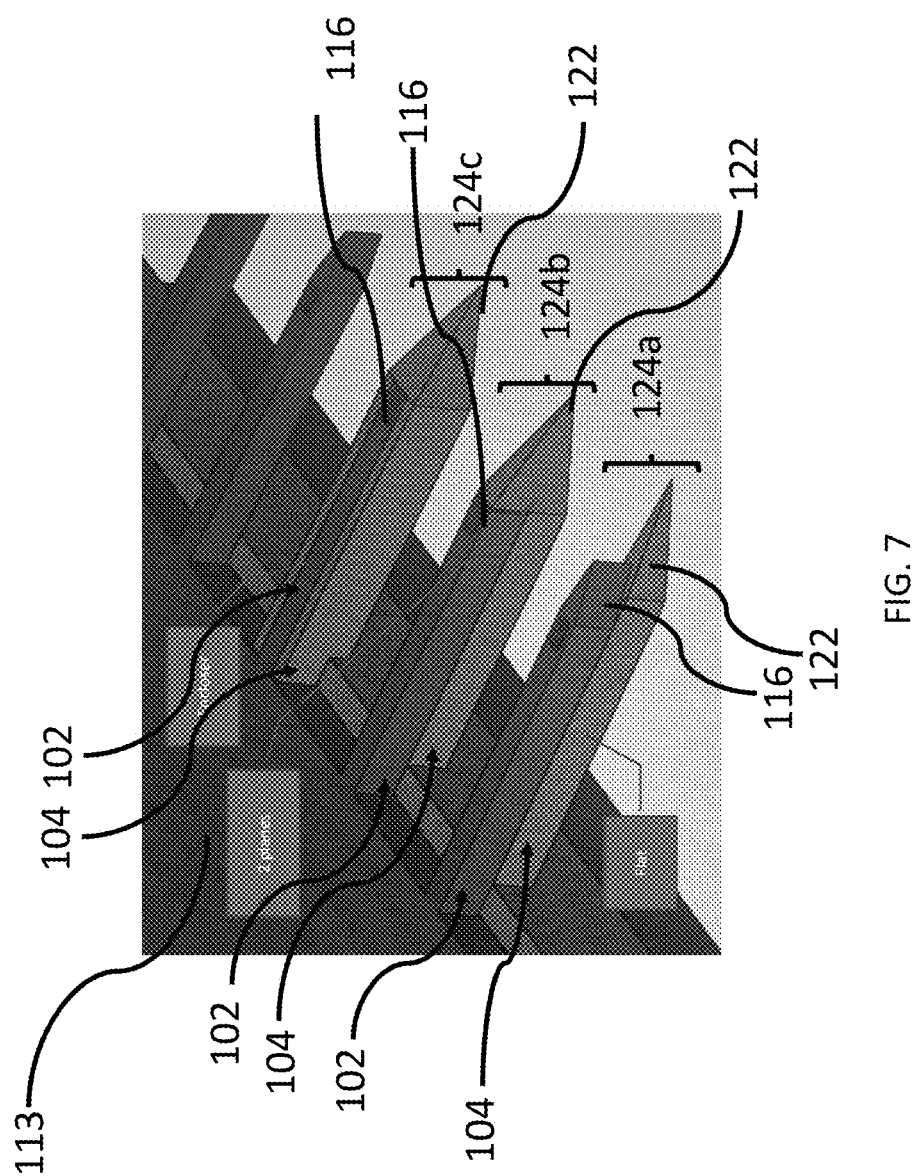
FIG. 7 is a perspective view of an array of layered microprobes, with various geometries, according to an exemplary embodiments of the present disclosure.

Looking to FIGS. 4-7, in exemplary embodiments, the ductile layer 104 includes an elongated shaft 120 that extends from a base 121 of the ductile layer 104 to a tip 122, partially congruent to the sensing unit 102. Together, the shafts 114, 120 of the sensing unit 102, and the ductile layer 104, respectively form a shaft 124 of the layered structure 101, as depicted in FIG. 7. In some embodiments, the sensing unit shaft 114 is connected along its entire length to the shaft 120 of the ductile layer 104, so as to provide support to the sensing unit 102 along its length such that the sensing unit 102 is mechanically constrained, minimizing forces acting on the sensing unit shaft 120. Furthermore, the ductile layer 104, in some embodiments, when viewed along a layering direction $D_L$ (shown in FIG. 2) of the layered structure 101, has an increased area relative to the sensing unit 102. For example, the sensing unit 102 has a first perimeter $P_S$, when viewed along the layering direction $D_L$ of the layered structure 101, and the ductile layer 104 has a second perimeter $P_D$, when viewed along the layering direction $D_L$ of the layered structure 101, such that the first perimeter $P_S$ is entirely within the second perimeter $P_D$. FIGS. 4-6 depict various shapes and sizes of ductile layers 104 with attached sensing units 102.

In a first exemplary embodiment, depicted in FIG. 4, a width of the ductile layer 104, when viewed along the layering direction $D_L$, is substantially the same as a width of the sensing unit 102. However, the shaft 120 and/or the tip 122 of the ductile layer 104 are longer than that of the sensing unit 102 such that the ductile layer 104 extends past the distal end 118 of the sensing unit 102.

In a second exemplary embodiment, depicted in FIG. 5, a width of the ductile layer 104, when viewed along the layering direction $D_L$, tapers toward a distal end thereof. However, as seen in the figure, the width of the ductile layer 104 is greater at a proximal base of the ductile layer shaft 120 than a width of the sensing unit shaft 114.

In a third exemplary embodiment, depicted in FIG. 6, a width of the ductile layer 104, when viewed along the layering direction $D_L$, is substantially uniform for a portion and then tapers to a distal end thereof. However, the width of the ductile layer, along its entire length, is greater than a width of the sensing unit 102.

In some embodiments, the shape of the ductile layer 104 may be tailored, based on the application, to protect the tip of the sensing unit 102 from foreseeable and/or unforeseeable forces that may cause fracturing or breaking. Specifically, as described above, in some embodiments, a distal portion of the ductile layer 104 extends past a distal end 118 of the tip 116 of the sensing unit 102. In these embodiments, because the ductile layer 104 projects distally past the distal end 118 of the sensing unit 102, the ductile layer 104 inserts into the skin prior to the sensing unit 102, shielding the sensing unit 102 from the axial and sideways insertion forces and minimizing the risk of fracturing the sensing unit tip 116. FIGS. 7-11 depict various exemplary designs in which the ductile layer 104 is shaped to protect the sensing unit tip 116 and distal end 118, as will be described in further detail below.

Figure 8:
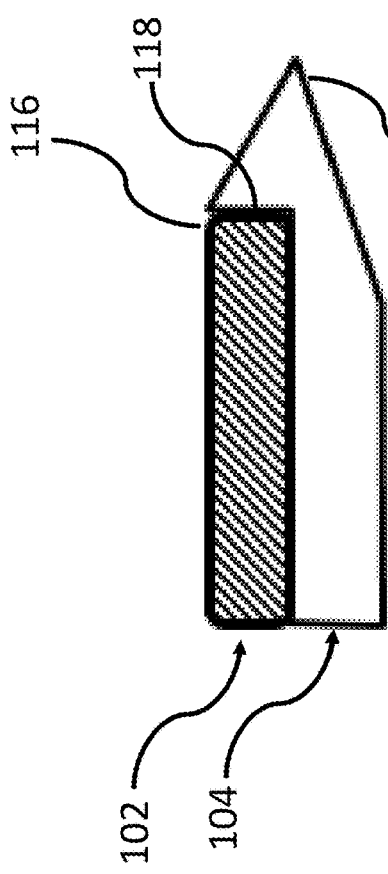
FIG. 8 is a cross-sectional view of a sensing unit tip and a ductile layer tip according to a first exemplary embodiment of the present disclosure.
Figure 9:
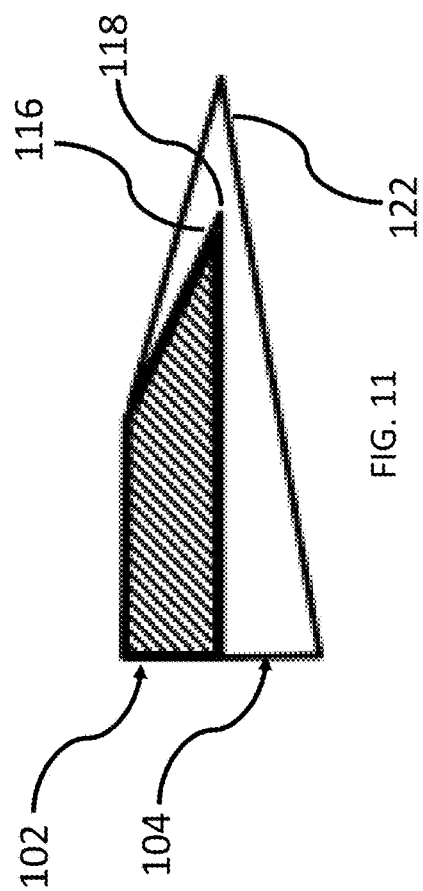
FIG. 9 is a cross-sectional view of a sensing unit tip and a ductile layer tip according to a second exemplary embodiment of the present disclosure.

In some embodiments, such as those depicted in FIGS. 8-9, the tips 116, 122 of respective ones of the sensing unit 102 and the ductile layer 104 are both sharpened for insertion into the skin of a subject. In such embodiments, the ductile layer tip 122 is configured to project or extend past the distal end 118 of the sensing unit 102. Thus, the ductile layer 104, rather than the sensing unit 102, is subjected to the majority of the insertion forces first. Moreover, because the ductile layer 104 is being inserted into the skin prior to the sensing unit 102, the ductile layer 104 forms an initial hole or opening in the skin. As a result, the tip 116 of the sensing unit 102 is inserted into the previously formed hole, such that the axial forces applied thereto are minimized, reducing the risk of fracturing, breaking or shattering of the comparatively brittle sensing unit 102. FIG. 7 depicts a perspective view of a layered structure shaft 124a with a similar tip 116, 122 configuration.

Figure 10:
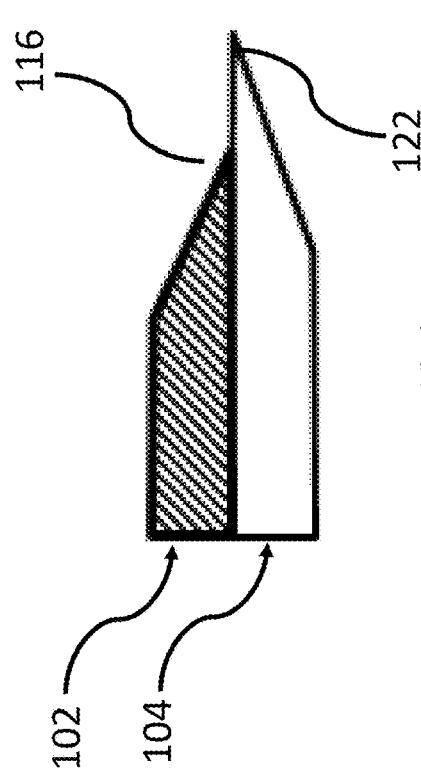
FIG. 10 is a cross-sectional view of a sensing unit tip and a ductile layer tip according to a third exemplary embodiment of the present disclosure.
Figure 11:
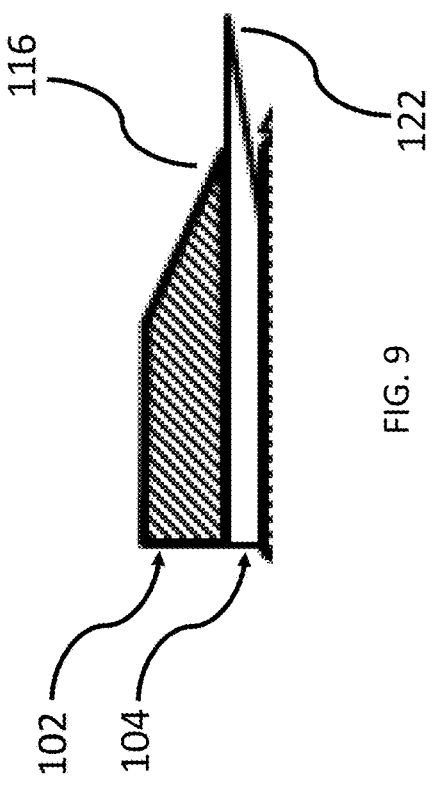
FIG. 11 is a cross-sectional view of a sensing unit tip and a ductile layer tip according to a fourth exemplary embodiment of the present disclosure.

In other embodiments, such as those depicted in FIGS. 10-11, the tip 116 of the sensing unit 102 is shielded in two planes from potential insertion/handling forces by the ductile layer 104. First, the ductile layer 104 includes a sharpened tip 122 that extends past the distal end 118 of the sensing unit 102, as with the ductile layer 104 of FIGS. 8 and 10. Second, the ductile layer 104 covers or encloses the distal end 118 or a face of the sensing unit tip 116 in the layering direction $D_L$. Thus, the tip 116 of the sensing unit 102 is almost entirely shielded from axial insertion forces because the ductile layer 104 is solely creating and widening the opening in the skin of the subject. FIG. 7 depicts a perspective view of a layered structure shaft 124b with a similar tip 116, 122 configuration that provides complete shielding of the tip 116 from axial insertion forces.

In some embodiments, the sensing unit 102 is also protected on lateral sides 142 thereof by the ductile layer 104, as depicted in FIGS. 12-14. Specifically, the ductile layer 104 covers at least a portion of the lateral sides of the sensing unit shaft 114 and tip 116 to minimize sideways or lateral forces that are applied thereto during handling and usage. In some embodiments, the ductile layer 104 comprises a recess 134 in a surface 136 thereof adjacent to the sensing unit 102, such that the sensing unit 102 is received within and at least partially enclosed by the recess 134. In some embodiments, the recess 134 has a depth D that is equal to a dimension W between a first side 126 of the sensing unit 102 that is adjacent to the ductile layer 104 and a second side 128 of the sensing unit 102 opposite (e.g., opposing) the first side 126, as depicted in FIG. 12. In other embodiments, the recess 134 has a depth D that is smaller than the dimension W of the sensing unit 102, as depicted in FIG. 13. In these embodiments, as can be seen in FIG. 13, the ductile layer 104 only covers a portion of the lateral surfaces of the sensing unit 102. In other embodiments, the recess 134 has a depth D that is larger than the dimension W of the sensing unit 102, as depicted in FIG. 14. In these embodiments, as can be seen in FIG. 14, the ductile layer 104 covers and projects past the lateral surfaces of the sensing unit 102. FIG. 7 depicts a perspective view of a layered structure shaft 124c with a tip 116, 122 configuration that protects the tip 116 on lateral sides. It is noted that FIG. 7 depicts an array of layered microprobes 100 with different microprobe designs. In other embodiments, each microprobe 100 of the array will have the same design.

In some embodiments, a length of the ductile layer, i.e., a dimension from the base 121 to the tip 122 of the ductile layer 104, is from 0.8 mm to 2.0 mm. In other embodiments, the length of the ductile layer 104 is from 0.8 mm to 1.8 mm. In other embodiments, the length of the ductile layer 104 is from 0.8 mm to 1.6 mm. In other embodiments, the length of the ductile layer 104 is from 0.8 mm to 1.4 mm. In other embodiments, the length of the ductile layer 104 is from 0.8 mm to 1.2 mm. In other embodiments, the length of the ductile layer 104 is from 0.8 mm to 1.0 mm.

In some embodiments, the length of the ductile layer 104 is from 1.0 mm to 2.0 mm. In other embodiments, the length of the ductile layer 104 is from 1.2 mm to 2.0 mm. In other embodiments, the length of the ductile layer 104 is from 1.4 mm to 2.0 mm. In other embodiments, the length of the ductile layer 104 is from 1.6 mm to 2.0 mm. In other embodiments, the length of the ductile layer 104 is from 1.8 mm to 2.0 mm.

In some embodiments, the length of the ductile layer 104 is from 1.2 mm to 1.6 mm. In other embodiments, the length of the ductile layer 104 is from 1.0 mm to 1.4 mm. In other embodiments, the length of the ductile layer 104 is from 1.4 mm to 1.6 mm. In other embodiments, the length of the ductile layer 104 is from 1.6 mm to 1.8 mm. In other embodiments, the length of the ductile layer 104 is from 1.2 mm to 1.8 mm.

In some embodiments, a thickness of the ductile layer 104 is from 0.01 mm to 0.3 mm. In other embodiments, a thickness of the ductile layer 104 is from 0.05 mm to 0.3 mm. In other embodiments, a thickness of the ductile layer 104 is from 0.1 mm to 0.3 mm. In other embodiments, a thickness of the ductile layer 104 is from 0.15 mm to 0.3 mm. In other embodiments, a thickness of the ductile layer 104 is from 0.1 mm to 0.3 mm. In other embodiments, a thickness of the ductile layer 104 is from 0.25 mm to 0.3 mm.

In some embodiments, a thickness of the ductile layer 104 is from 0.01 mm to 0.25 mm. In other embodiments, a thickness of the ductile layer 104 is from 0.01 mm to 0.2 mm. In other embodiments, a thickness of the ductile layer 104 is from 0.01 mm to 0.15 mm. In other embodiments, a thickness of the ductile layer 104 is from 0.01 mm to 0.1 mm. In other embodiments, a thickness of the ductile layer 104 is from 0.01 mm to 0.05 mm.

In some embodiments, a thickness of the ductile layer 104 is from 0.05 mm to 0.25 mm. In other embodiments, a thickness of the ductile layer 104 is from 0.1 mm to 0.15 mm. In other embodiments, a thickness of the ductile layer 104 is from 0.1 mm to 0.25 mm. In other embodiments, a thickness of the ductile layer 104 is from 0.15 mm to 0.2 mm. In other embodiments, a thickness of the ductile layer 104 is from 0.15 mm to 0.25 mm, a thickness of the ductile layer 104 is from 0.05 mm to 0.1 mm.

In the above exemplary configurations, a width and thickness of the Si of the sensing unit 102 can be reduced because of the reduction in external forces and torques applied thereto. Thus, in some embodiments, the combined thickness and/or width of the sensing unit 102 and the ductile layer 104 can be smaller than that which would be necessary for a sensing unit alone to withstand handling and insertion forces. These smaller dimensions are beneficial in that they can be inserted into the skin or other tissue with lesser force, causing less pain.

In some embodiments, the layered structure of the microprobe 100 includes a deformable layer 106 positioned on a first side 126 of the sensing unit 102, between the sensing unit 102 and the ductile layer 104. In some embodiments, the deformable layer 106 is also positioned on lateral sides 142 of the sensing unit 102. As used herein the deformable layer 106 is defined as a layer comprising a material that has sufficient material properties (e.g., elasticity) so as to perform at least one desired function under normal operating procedures of the sensing system 10 (e.g., to deform under a stress that is applied to the sensing system 10). In some embodiments, the deformable layer 106 electrically insulates the Si of the sensing unit 102 from the material of the ductile layer 104. In some embodiments, the ductile layer 104 shields the sensing unit 102 from electrical noise and/or acts as a ground for the at least one sensor 112. In other embodiments, where it is preferable that the sensing unit 102 and the ductile layer 104 be in contact with each other, such as for precise positioning of the sensing unit 102 and the ductile layer 104 relative to one another when there is less process control on the thickness of the deformable layer 106, depressions or channels may be incorporated into the surface of the Si of the sensing unit 102 and the ductile layer 104. The deformable layer 106 may then be positioned within the channels while other portions of the sensing unit 102 and ductile layer 104 surfaces are brought in physical contact.

In some embodiments, the deformable layer 106 comprises, for example, a polymeric substance such as polyurethane, silicone, polyacrylate or methacrylate ester, a polymethyl methacrylate, polyamide, SU-8, Parylene or epoxy resin, polydimethylsiloxane. In some embodiments, the deformable layer 106 is reinforced with a metal oxide such as aluminum oxide, silicon oxide or silicon oxynitride. In some embodiments, the deformable layer 106 comprises a viscoelastic material, such as amorphous polymers, semi-crystalline polymers or biopolymers.

In some embodiments, the deformable layer 106 is an adhesive. In some embodiments, the deformable layer 106 includes a first adhesive, a deformable material and a second adhesive. Specifically, in some embodiments, the deformable layer 106 includes a deformable material that is positioned between the first adhesive and the second adhesive.

In some embodiments, a thickness of the deformable layer 106 is from 1 micron to 100 microns. In other embodiments, a thickness of the deformable layer 106 is from 5 microns to 100 microns. In other embodiments, a thickness of the deformable layer 106 is from 10 microns to 100 microns. In other embodiments, a thickness of the deformable layer 106 is from 50 microns to 100 microns. In other embodiments, a thickness of the deformable layer 106 is from 90 microns to 100 microns. In other embodiments, a thickness of the deformable layer 106 is from 95 microns to 100 microns.

In some embodiments, a thickness of the deformable layer 106 is from 1 micron to 100 microns. In other embodiments, a thickness of the deformable layer 106 is from 1 micron to 95 microns. In other embodiments, a thickness of the deformable layer 106 is from 1 micron to 75 microns. In other embodiments, a thickness of the deformable layer 106 is from 1 micron to 50 microns. In other embodiments, a thickness of the deformable layer 106 is from 1 micron to 10 microns. In other embodiments, a thickness of the deformable layer 106 is from 1 micron to 5 microns.

In some embodiments, a thickness of the deformable layer 106 is from 5 microns to 10 microns. In other embodiments, a thickness of the deformable layer 106 is from 10 microns to 50 microns. In other embodiments, a thickness of the deformable layer 106 is from 50 microns to 75 microns. In other embodiments, a thickness of the deformable layer 106 is from 5 microns to 50 microns. In other embodiments, a thickness of the deformable layer 106 is from 10 microns to 95 microns. In other embodiments, a thickness of the deformable layer 106 is from 25 microns to 50 microns.

In some embodiments, a thickness of the deformable layer 106 is more than the larger of a surface roughness Ra of the sensing unit 102 and a surface roughness Ra of the ductile layer 104, such that the sensing unit 102 and the ductile layer 104 are not in contact with one another.

In some embodiments, the layered structure of the microprobe 100 also includes a sensor-interface layer 108. The sensor-interface layer 108, in some embodiments, provides the sensor 112 with specific functions such as, for example, analyte specificity. Specifically, the sensor-interface layer 108 may include enzymes antibodies, small molecules and hydrogels. In some embodiments, the sensor-interface layer also provides a barrier between the sensor 112 and the surrounding environment. In some embodiments, the sensor-interface layer 108 is biodegradable and changes properties over time or over its application lifetime. As depicted in FIG. 2, the sensor-interface layer 108 is positioned on the second side 128 of the sensing unit 102, opposite the first side 126. In some embodiments, the sensor-interface layer 108 is in contact with the material, e.g. Si, of the sensing unit 102 and components of the sensor 112. In an embodiment, the sensor-interface layer 108 is applied to the sensing unit 102 as part of the sensor manufacturing process, using semiconductor coating processes such as, for example, spin coating, spray coating, brushing, dipping, chemical vapor deposition or physical vapor deposition.

In some embodiments, the sensor-interface layer 108 comprises, for example, a polyamide, a polyurethane, or other material. In some embodiments, the sensor-interface layer 108 comprises a material that has a high tensile strength. In other embodiments, the sensor-interface layer 108 comprises a flexible material.

In some embodiments, the material of the sensor-interface layer 108 will enable patterning thereof such that a planar structure can be formed that includes gaps, holes, openings, vias, traces, crevasses or channels. In some embodiments, the openings or gaps are circular, oval, rectangular, or other shapes. In some embodiments, there is an opening over portions of the sensor 112. In some embodiments, there is an opening over an electrical, electrochemical or photoelectrical component of the sensor 112 such as, for example, an electrode, an electrically conductive trace or a nanowire. In some embodiments, there is an opening over portions of a field-effect-transistor sensor.

In some embodiments, the sensor-interface layer 108 will be one or more of: chemically inert, biocompatible, biodegradable, anti-fouling, hydrophobic, hydrophilic, or have a low friction coefficient.

In some embodiments, a thickness of the sensor-interface layer 108 is from 10 nanometers to 200 microns. In other embodiments, a thickness of the sensor-interface layer 108 is from 100 nanometers to 200 microns. In other embodiments, a thickness of the sensor-interface layer 108 is from 1 micron to 200 microns. In other embodiments, a thickness of the sensor-interface layer 108 is from 10 microns to 200 microns. In other embodiments, a thickness of the sensor-interface layer 108 is from 50 microns to 200 microns. In other embodiments, a thickness of the sensor-interface layer 108 is from 100 microns to 200 microns.

In some embodiments, a thickness of the sensor-interface layer 108 is from 10 nanometers to 150 microns. In other embodiments, a thickness of the sensor-interface layer 108 is from 10 nanometers to 100 microns. In other embodiments, a thickness of the sensor-interface layer 108 is from 10 nanometers to 50 microns. In other embodiments, a thickness of the sensor-interface layer 108 is from 10 nanometers to 10 microns. In other embodiments, a thickness of the sensor-interface layer 108 is from 10 nanometers to 1 micron. In other embodiments, a thickness of the sensor-interface layer 108 is from 10 nanometers to 100 nanometers.

In some embodiments, a thickness of the sensor-interface layer 108 is from 100 nanometers to 1 micron. In other embodiments, a thickness of the sensor-interface layer 108 is from 1 micron to 10 microns. In other embodiments, a thickness of the sensor-interface layer 108 is from 10 microns to 50 microns. In other embodiments, a thickness of the sensor-interface layer 108 is from 50 microns to 100 microns.

In some embodiments, as depicted in FIGS. 15-16, the sensor-interface layer 108 only covers the sensor 112 of the sensing unit 102. Specifically, when viewed in a layering direction $D_L$, a perimeter of the sensor-interface layer 108 is substantially the same as a perimeter of the sensor 112 such that other portions of the sensing unit 102 are not covered by the sensor-interface layer 108. In some embodiments, the sensor-interface layer 108 covers the sensor 112 of the sensing unit 102 and a portion of the sensing unit 102. Specifically, when viewed in a layering direction $D_L$, a perimeter of the sensor-interface layer 108 is smaller than the perimeter of the sensor.

In some embodiments, as depicted in FIG. 2, the microprobe 100 includes at least one encapsulant 110 at least partially encapsulating the layered structure of the microprobe 100. The encapsulant 110, in some embodiments, is configured to contain any debris that may be formed by (e.g., may originate from) the components of the layered structure encapsulated therein. The encapsulant 110, in some embodiments, is also configured to ensure that any debris that is formed by the layered structure can be extracted with the sensing system 10 during removal from a subject's skin.

In some embodiments, the encapsulant 110 is designed to isolate the microprobe components from a surrounding environment to increase their usable lifetime. In some embodiments, the encapsulant 110 provides electrical isolation. In other embodiments, the encapsulant 110 provides mechanical, or spatial, isolation but not electrical isolation. In some embodiments, the encapsulant 110 provides a uniform friction coefficient on all aspects of the surface of the microprobe 100. A uniform friction coefficient on all aspects of the microprobe surface can reduce asymmetrical lateral forces that may cause buckling or twisting of the microprobe shaft 124. In further embodiments, the encapsulant 110 provides mechanical isolation but enables passage or diffusion of liquids, gasses, chemicals and/or biochemicals.

In some embodiments, the encapsulant 110 partially encapsulates the layered structure 101. For example, in some embodiments, the encapsulant 110 covers from 10% to 99% of the surface of the layered structure 101. In other embodiments, the encapsulant 110 covers from 20% to 99% of the layered structure 101. In other embodiments, the encapsulant 110 covers from 25% to 99% of the layered structure 101. In other embodiments, the encapsulant 110 covers from 50% to 99% of the layered structure 101. In other embodiments, the encapsulant 110 covers from 75% to 99% of the layered structure 101. In other embodiments, the encapsulant 110 covers from 90% to 99% of the layered structure 101.

In some embodiments, the encapsulant 110 covers from 10% to 90% of the layered structure 101. In other embodiments, the encapsulant 110 covers from 10% to 75% of the layered structure 101. In other embodiments, the encapsulant 110 covers from 10% to 50% of the layered structure 101. In other embodiments, the encapsulant 110 covers from 10% to 25% of the layered structure 101. In other embodiments, the encapsulant 110 covers from 10% to 20% of the layered structure 101.

In some embodiments, the encapsulant 110 covers from 20% to 90% of the layered structure 101. In other embodiments, the encapsulant 110 covers from 25% to 75% of the layered structure 101. In other embodiments, the encapsulant 110 covers from 50% to 75% of the layered structure 101. In other embodiments, the encapsulant 110 covers from 20% to 5% of the layered structure 101. In other embodiments, the encapsulant 110 covers from 75% to 90% of the layered structure 101.

In some embodiments, the encapsulant 110 encapsulates portions of some facets of the layered structure 101. In other embodiments, the encapsulant 110 encapsulates portions of a top facet of the layered structure 101. In other embodiments, the encapsulant 110 encapsulates the top face and portions of side facets of the layered structure 101. In further embodiments, the encapsulant 110 encapsulates the entirety of the layered structure 101 except for a portion of a tip 122 thereof, as will be described in further detail below.

In some embodiments, the encapsulant 110 includes a hydrogel at a portion thereof that increases in volume when in contact with a liquid environment. For example, in some embodiments, the encapsulant 110 includes a hydrogel in a fixed area about the sensor 112. In some embodiments, the hydrogel is not a part of the encapsulant material. The change in volume has many potential benefits including, for example: enabling the diffusion of analytes and biomolecules from the tissue or liquid environment to the sensor, volume tissue displacement, easier anchoring of the microprobe 100 into tissue, anticlogging, anti-inflammatory and anti-proliferative properties, the latter preventing sensor clogging by growing tissue. In some embodiments, a volume of the hydrogel can increase by 1% to 1000%. In other embodiments, a volume of the hydrogel can increase by 10% to 1000%. In other embodiments, a volume of the hydrogel can increase by 100% to 1000%. In other embodiments, a volume of the hydrogel can increase by 500% to 1000%.

In some embodiments, a volume of the hydrogel can increase by 1% to 500%. In other embodiments, a volume of the hydrogel can increase by 1% to 100%. In other embodiments, a volume of the hydrogel can increase by 1% to 10%. In other embodiments, a volume of the hydrogel can increase by 1% to 5%.

In some embodiments, a volume of the hydrogel can increase by 10% to 100%. In other embodiments, a volume of the hydrogel can increase by 100% to 500%. In other embodiments, a volume of the hydrogel can increase by 5% to 10%. In other embodiments, a volume of the hydrogel can increase by 10% to 500%.

A thickness of the encapsulant 110 is, in some embodiments, from 100 nanometers to 200 microns. In other embodiments, a thickness of the encapsulant 110 is from 1 micron to 200 microns. In other embodiments, a thickness of the encapsulant 110 is from 10 microns to 200 microns. In other embodiments, a thickness of the encapsulant 110 is from 50 microns to 200 microns. In other embodiments, a thickness of the encapsulant 110 is from 100 microns to 200 microns.

In some embodiments, a thickness of the encapsulant 110 is from 100 nanometers to 100 microns. In other embodiments, a thickness of the encapsulant 110 is from 100 nanometers to 50 microns. In other embodiments, a thickness of the encapsulant 110 is from 100 nanometers to 10 microns. In other embodiments, a thickness of the encapsulant 110 is from 100 nanometers to 1 micron.

In some embodiments, a thickness of the encapsulant 110 is from 1 micron to 100 microns. In other embodiments, a thickness of the encapsulant 110 is from 10 microns to 50 microns. In other embodiments, a thickness of the encapsulant 110 is from 50 microns to 150 microns. In other embodiments, a thickness of the encapsulant 110 is from 1 micron to 10 microns.

In some embodiments, the encapsulant comprises at least one of an oxide, a metal oxide, a native oxide, a polymer, a parylene, a primer agent a polytetrafluoroethylene or a polyamide. In some embodiments, the encapsulant 110 comprises more than one material.

The encapsulant 110 can be applied to the layered structure 101 of the microprobe 100 via dipping, chemical vapor deposition, physical vapor deposition, brushing, spray coating, or other methods.

In some embodiments, the encapsulant 110 will be one or more of: chemically inert, biocompatible, biodegradable, anti-fouling, hydrophobic, hydrophilic, or have a low friction coefficient.

In some embodiments, the material of the encapsulant 110 will enable patterning thereof such that a planar structure can be formed that includes gaps, holes, openings, vias, traces, crevasses or channels. In some embodiments, the openings or gaps are circular, oval, rectangular, or other shapes. In some embodiments, there is an opening 140 over portions of the sensor 112, as depicted in FIG. 3. In some embodiments, the opening 140 is positioned on a shaft of the microprobe 100. In other embodiments, the opening 140 is positioned on a tip of the microprobe 100.

In some embodiments, the microprobe 100 is selectively encapsulated. For example, in some embodiments, a bottom aspect and vertical facets of the layered structure 101 of the microprobe 100 are encapsulated while the sensing unit 102 and sensor-interface layer 108 are not encapsulated. In another embodiment, the bottom aspect and vertical facets of the layered structure 101 are encapsulated with a first encapsulation material while the sensing unit 102 and the sensor-interface layer 106 are encapsulated with a second encapsulation material.

In some embodiments, different layers or components within the layered structure 101 may also be selectively encapsulated. For example, some of the layers may be encapsulated in order to prevent debris, to isolate the layer electrically, or to isolate the layer from the environment. In some embodiments, one or both of the sensing unit 102 and the ductile layer 104 is encapsulated with an oxide, a metal oxide, a native oxide, a polymer, a primer agent, a parylene, a polytetrafluoroethylene or a polyimide.

A thickness of the encapsulant 110 may also vary about the layered structure 101. For example, in some embodiments, a thickness of the encapsulant 110 is uniform about all facets of the layered structure 101. However, in other embodiments, a thickness of the encapsulant 110 is not uniform about all facets of the layered structure 101. For example, in one embodiment, a thickness of the encapsulant 110 at a tip of the layered structure shaft 124 is thinner than a thickness of the encapsulant 110 on the top and bottom facets.

In some embodiments, a shape and thickness of the encapsulant 110 along the layered structure 101 can be varied. Specifically, the shape and thickness of the encapsulant 110 along the shaft 124 and a tip 130 of the layered structure 101 are determined by many factors including, for example, layered structure tip 130 dimensions, encapsulating material properties, the method by which the encapsulant 110 is applied to the layered structure 101, etc. Three requirements of the encapsulation of the layered structure tip 130 include: 1) the encapsulant will not significantly increase the layered structure tip 130 dimensions, enabling painless insertion into the skin; 2) the encapsulant will strongly adhere to the layered structure tip 130; and 3) the encapsulant material will not create debris near the layered structure tip 130 during handling, insertion or usage (i.e., no peeling, cracking, tearing or breaking of the encapsulant material).

In some embodiments, the thickness of the encapsulant 110 decreases along the shaft 124 of layered structure 101 as it approaches a tip thereof, as depicted in FIG. 17. Thus, at a distal end 132 of the layered structure tip 130, the encapsulant converges with the shape of the ductile layer 104. In another embodiment, the thickness of the encapsulant 110 is uniform along the shaft 124 of the layered structure 101 and extends past the distal end 132 of the tip 130 thereof. Specifically, the encapsulant 110 extends past and encapsulates the tip 130 of the layered structure 101, as depicted in FIG. 18. In a further embodiment, the thickness of the encapsulant 110 again decreases along the shaft 124 of the layered structure 101 as it approaches the tip 130 thereof. However, rather than extending to the distal end 132 of the tip 130 of the layered structure 101, the encapsulant 110 converges with the tip 130 proximally of the distal end 132, as depicted in FIG. 19. In another embodiment, a thickness of the encapsulant 110 is uniform along a portion of the shaft 124 of the layered structure 101 and ends proximally to the layered structure tip 130 in a square profile, as depicted in FIG. 20.

Figure 21:
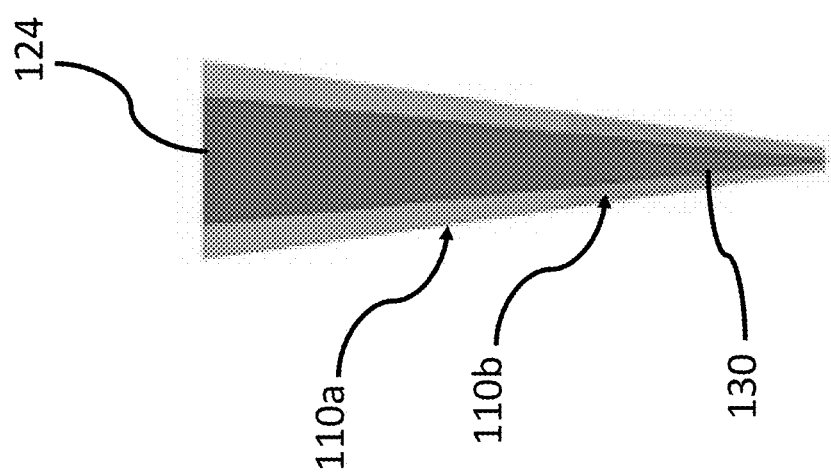
FIG. 21 is a cross-sectional view of a portion of a microprobe shaft and tip according to a fifth exemplary embodiment of the present disclosure.

In some embodiments, where the encapsulant includes more than one encapsulation materials, a first encapsulation material 110a is provided along a proximal portion of the shaft 124 and/or tip 130 while a second encapsulation material 110b is provided along a distal portion of the shaft 124 and/or tip 130, as depicted in FIG. 21.

In some embodiments, the distance Mo between adjacent microprobes 100 (as depicted in FIG. 1A) is from 0.1 mm to 3.0 mm. In other embodiments, the distance between adjacent microprobes 100 is from 0.1 mm to 2.5 mm. In other embodiments, the distance between adjacent microprobes 100 is from 0.1 mm to 2.0 mm. In other embodiments, the distance between adjacent microprobes 100 is from 0.1 mm to 1.5 mm. In other embodiments, the distance between adjacent microprobes 100 is from 0.1 mm to 1.0 mm. In other embodiments, the distance between adjacent microprobes 100 is from 0.1 mm to 0.5 mm.

In some embodiments, the distance between adjacent microprobes 100 is from 0.5 mm to 3.0 mm. In other embodiments, the distance between adjacent microprobes 100 is from 1.0 mm to 3.0 mm. In other embodiments, the distance between adjacent microprobes 100 is from 1.5 mm to 3.0 mm. In other embodiments, the distance between adjacent microprobes 100 is from 2.0 mm to 3.0 mm. In other embodiments, the distance between adjacent microprobes 100 is from 2.5 mm to 3.0 mm.

In some embodiments, the distance between adjacent microprobes 100 is from 0.5 mm to 2.5 mm. In other embodiments, the distance between adjacent microprobes 100 is from 1.0 mm to 2.0 mm. In other embodiments, the distance between adjacent microprobes 100 is from 1.5 mm to 2.5 mm. In other embodiments, the distance between adjacent microprobes 100 is from 0.5 mm to 1.0 mm. In other embodiments, the distance between adjacent microprobes 100 is from 2.0 mm to 2.5 mm.

As previously noted, the smaller the sensing system, the lesser the pain felt during insertion and use. Thus, it is an objective of the present invention to minimize the dimensions of the disclosed sensing system 10. Due to the novel structure of the sensing system 10 of the present embodiments, the dimensions thereof have been minimized relative to conventional microprobe systems.

For example, in some embodiments, a length LL (as depicted in FIG. 1A) of the sensing system 10 is from 2 mm to 10 mm. In other embodiments, a length of the sensing system 10 is from 2 mm to 8 mm. In other embodiments, a length of the sensing system 10 is from 2 mm to 6 mm. In other embodiments, a length of the sensing system 10 is from 2 mm to 4 mm.

In some embodiments, a length of the sensing system 10 is from 4 mm to 10 mm. In other embodiments, a length of the sensing system 10 is from 6 mm to 10 mm. In other embodiments, a length of the sensing system 10 is from 8 mm to 10 mm.

In other embodiments, a length of the sensing system 10 is from 4 mm to 8 mm. in some embodiments, a length of the sensing system 10 is from 4 mm to 6 mm. In other embodiments, a length of the sensing system 10 is from 6 mm to 8 mm.

In some embodiments, a width WL of the sensing system 10 (as depicted in FIG. 1A) is from 0.5 mm to 5 mm. In other embodiments, a width of the sensing system 10 is from 0.5 to 4.5 mm. In other embodiments, a width of the sensing system 10 is from 0.5 to 4.0 mm. In other embodiments, a width of the sensing system 10 is from 0.5 to 3.5 mm. In other embodiments, a width of the sensing system 10 is from 0.5 to 3.0 mm. In other embodiments, a width of sensing system 10 is from 0.5 to 2.5 mm. In other embodiments, a width of the sensing system 10 is from 0.5 to 2.0 mm. In other embodiments, a width of the sensing system 10 is from 0.5 to 1.5 mm. In other embodiments, a width of the sensing system 10 is from 0.5 to 1.0 mm.

In some embodiments, a width of the sensing system 10 is from 1.0 mm to 5.0 mm. In other embodiments, a width of the sensing system 10 is from 1.5 to 5.0 mm. In other embodiments, a width of the sensing system 10 is from 2.0 to 5.0 mm. In other embodiments, a width of the sensing system 10 is from 2.5 to 5.0 mm. In other embodiments, a width of the sensing system 10 is from 3.0 to 5.0 mm. In other embodiments, a width of the sensing system 10 is from 3.5 to 5.0 mm. In other embodiments, a width of the sensing system 10 is from 4.0 to 5.0 mm. In other embodiments, a width of the sensing system 10 is from 4.5 to 5.0 mm.

In some embodiments, a width of the sensing system 10 is from 1.0 mm to 4.5 mm. In other embodiments, a width of the sensing system 10 is from 1.5 to 4.0 mm. In other embodiments, a width of the sensing system 10 is from 3.5 to 4.0 mm. In other embodiments, a width of the sensing system 10 is from 2.0 to 3.5 mm. In other embodiments, a width of the sensing system 10 is from 4.0 to 4.5 mm.

In some embodiments, a thickness of the sensing system 10 is from 0.05 mm to 0.4 mm. In other embodiments, a thickness of the sensing system 10 is from 0.1 mm to 0.4 mm. In other embodiments, a thickness of the sensing system 10 is from 0.15 mm to 0.4 mm. In other embodiments, a thickness of the sensing system 10 is from 0.2 mm to 0.4 mm. In other embodiments, a thickness of the sensing system 10 is from 0.25 mm to 0.4 mm. In other embodiments, a thickness of the sensing system 10 is from 0.3 mm to 0.4 mm. In other embodiments, a thickness of the sensing system 10 is from 0.35 mm to 0.4 mm.

In some embodiments, a thickness of the sensing system 10 is from 0.05 mm to 0.35 mm. In other embodiments, a thickness of the sensing system 10 is from 0.05 mm to 0.3 mm. In other embodiments, a thickness of the sensing system 10 is from 0.05 mm to 0.25 mm. In other embodiments, a thickness of the sensing system 10 is from 0.05 mm to 0.2 mm. In other embodiments, a thickness of the sensing system 10 is from 0.05 mm to 0.15 mm. In other embodiments, a thickness of the sensing system 10 is from 0.05 mm to 0.1 mm.

In some embodiments, a thickness of the sensing system 10 is from 0.05 mm to 0.35 mm. In other embodiments, a thickness of the sensing system 10 is from 0.1 mm to 0.15 mm. In other embodiments, a thickness of the sensing system 10 is from 0.15 mm to 0.25 mm. In other embodiments, a thickness of the sensing system 10 is from 0.2 mm to 0.3 mm. In other embodiments, a thickness of the sensing system 10 is from 0.05 mm to 0.35 mm. In other embodiments, a thickness of the sensing system 10 is from 0.3 mm to 0.35 mm. In other embodiments, a thickness of the sensing system 10 is from 0.5 mm to 0.1 mm.

It is appreciated that certain features of the disclosure, which are, for clarity, described in the context of separate embodiments, may also be provided in a single embodiment. Conversely, various features of the disclosure, which are, for brevity, described in the context of a single embodiment, may also be provided separately or in any suitable sub combination or as suitable in any other described embodiment of the disclosure. Certain features described in the context of various embodiments are not considered essential features of these embodiments, unless the embodiment is inoperative without those elements.

What is claimed is:

1. A sensing system, comprising:
    at least one microprobe, wherein the microprobe comprises:
        a layered structure in which each layer is arranged along a layering direction such that layers of the layered structure are stacked on top of one another, the layered structure including:
            a sensing unit comprising at least one sensor,
                wherein the at least one sensor comprises a working electrode,
                wherein the sensing unit has a first perimeter when viewed along a layering direction of the layered structure,
                wherein the sensing unit comprises a first material having a first material toughness, and
                wherein the sensing unit includes a first side and an opposing second side;
            a deformable layer positioned on the first side of the sensing unit, wherein the deformable layer is configured to deform under stress,
            a ductile layer positioned on the deformable layer opposite the sensing unit,
                wherein the ductile layer has a second perimeter when viewed along the layering direction of the layered structure, wherein the first perimeter is entirely within the second perimeter,
                wherein the ductile layer comprises a second material having a second material toughness greater than the first material toughness, and
                wherein the deformable layer mechanically couples the sensing unit to the ductile layer in a manner so as to transfer at least a portion of strain resulting from stress applied to the sensing unit to the ductile layer, and
            a sensor-interface layer positioned on the second side of the sensing unit; and
        at least one encapsulant,
            wherein the at least one encapsulant at least partially encapsulates the layered structure, and
            wherein the at least one encapsulant is configured to mechanically isolate the layered structure from a surrounding environment.

2. The sensing system of claim 1, wherein the encapsulant is configured to contain debris originating from at least one of the first material, the second material, a deformable layer material, or a sensor-interface material.

3. The sensing system of claim 1, wherein the encapsulant is at least one of:
    chemically inert, biocompatible, biodegradable, anti-fouling, hydrophobic or hydrophilic.

4. The sensing system of claim 1, wherein the encapsulant is configured to electrically isolate the layered structure from the surrounding environment.

5. The sensing system of claim 1, wherein the encapsulant includes an opening that is open to the sensor-interface layer.

6. The sensing system of claim 5, wherein the opening contains a hydrogel that is configured to increase in volume when in contact with liquid.

7. The sensing system of claim 1, wherein the encapsulant completely encapsulates the layered structure.

8. The sensing system of claim 1, wherein at least a portion of a tip of the sensing unit is not encapsulated.

9. The sensing system of claim 1, wherein the sensor-interface layer is at least one of:
    chemically inert, biocompatible, biodegradable, anti-fouling, hydrophobic or hydrophilic.

10. The sensing system of claim 1, wherein the sensor-interface layer has a thickness that is in a range of from 10 nanometers to 200 microns.

11. The sensing system of claim 1, wherein the deformable layer is an adhesive.

12. The sensing system of claim 1, wherein the deformable layer has a thickness that is in a range of from 1 micron to 100 microns.

13. The sensing system of claim 1, wherein the sensing unit is adhered to the ductile layer by a layered structure comprising a first adhesive, the deformable material, and a second adhesive.

14. The sensing system of claim 1, wherein a thickness of the deformable layer is less than a surface roughness Ra of each of the sensing unit and the ductile layer.

15. The sensing system of claim 1, wherein the deformable layer electrically insulates the sensing unit from the ductile layer.

16. The sensing system of claim 1, wherein the ductile layer comprises a metal.

17. The sensing system of claim 1, wherein the ductile layer comprises a recess in a surface adjacent to the sensing unit, wherein the sensing unit is received within and at least partially enclosed by the recess.

18. The sensing system of claim 1, wherein the sensing unit comprises a shaft and a tip.

19. The sensing system of claim 18, wherein the ductile layer comprises a shaft and a tip.

20. The sensing system of claim 19, wherein the tip of the ductile layer projects distally past the tip of the sensing unit so that the ductile layer is configured to absorb axial insertion forces applied thereto during use.

21. A microprobe, comprising:
- a layered structure in which each layer is arranged along a layering direction such that layers of the layered structure are stacked on top of one another, the layered structure, comprising:
  - a sensing unit comprising at least one sensor,
    - wherein the at least one sensor comprises a working electrode,
    - wherein the sensing unit has a first perimeter when viewed along a layering direction of the layered structure,
    - wherein the sensing unit comprises a first material having a first material toughness, and
    - wherein the sensing unit includes a first side and an opposing second side;
  - a deformable layer positioned on the first side of the sensing unit,
    - wherein the deformable layer is configured to deform under stress,
  - a ductile layer positioned on the deformable layer opposite the sensing unit,
    - wherein the ductile layer has a second perimeter when viewed along the layering direction of the layered structure, wherein the first perimeter is entirely within the second perimeter,
    - wherein the ductile layer comprises a second material having a second material toughness greater than the first material toughness, and
    - wherein the deformable layer mechanically couples the sensing unit to the ductile layer in a manner so as to transfer at least a portion of strain resulting from stress applied to the sensing unit to the ductile layer, and
  - a sensor-interface layer positioned on the second side of the sensing unit; and
- at least one encapsulant,
  - wherein the at least one encapsulant at least partially encapsulates the layered structure, and
  - wherein the at least one encapsulant is configured to mechanically isolate the layered structure from a surrounding environment.

* * * * *